Dec. 16, 1947.  H. J. KAUTH  2,432,623
ENAMEL CONTAINING FURFURYL ALCOHOL CONDENSATE AND POLYVINYL ACETAL
Filed June 18, 1943
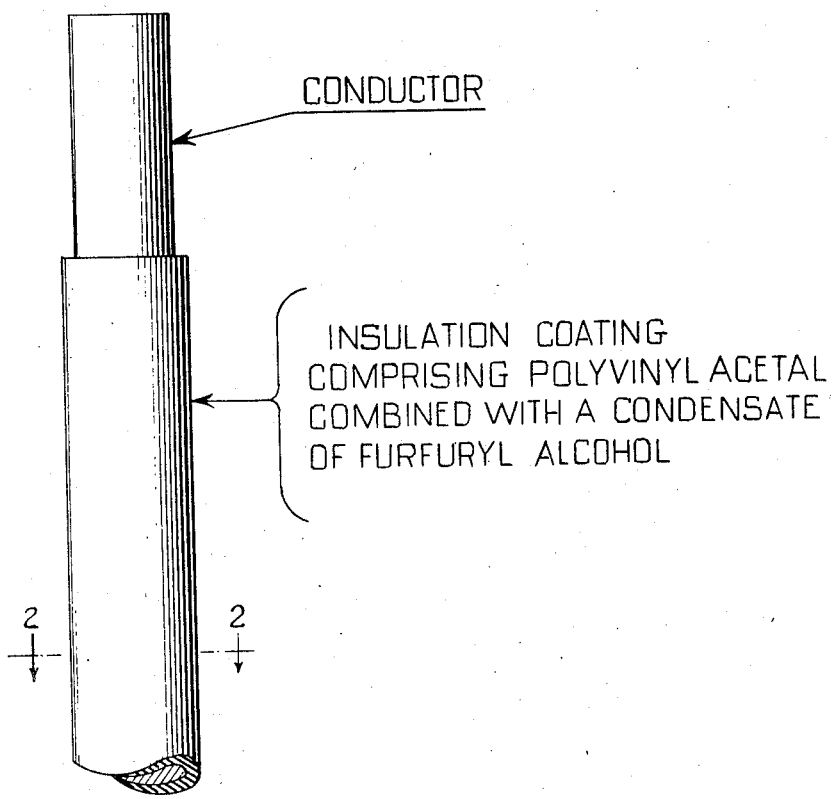
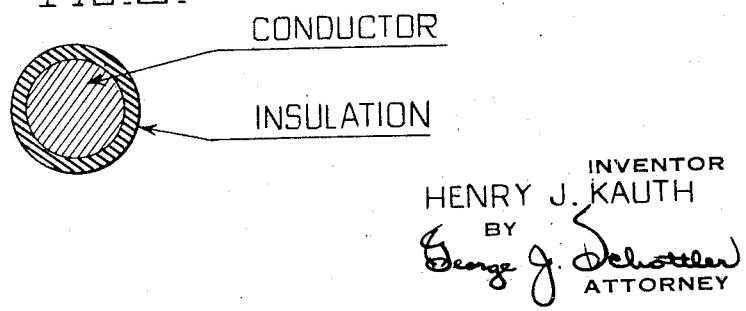
INVENTOR
HENRY J. KAUTH Patented Dec. 16, 1947

2,432,623

UNITED STATES PATENT OFFICE 2,432,623

ENAMEL CONTAINING FURFURYL ALCOHOL CONDENSATE AND POLYVINYL ACETAL

Henry J. Kauth, Schenectady, N. Y., assignor to General Cable Corporation, New York, N. Y., a corporation of New Jersey Application June 18, 1943, Serial No. 491,390

9 Claims. (Cl. 260—32)

This invention, like that described in my Letters Patent No. 2,323,333 dated July 6, 1943, relates to the production of resinous compositions suitable for wire enamels from partially condensed furfuryl alcohol as a base. Prior to my earlier invention to which I have just referred there was no practicable way, so far as I am aware, of imparting sufficient toughness and flexibility to the furan resins to adapt them for use in the production of wire enamels; and hence, notwithstanding the unusually high degree of hardness, solvent-resistance, chemical inertness, and dielectric properties exhibited by their films, and which in all these respects made them excellently suited to the production of wire enamels, their brittleness was a bar to their use for that purpose. The aim of the present invention, like that of my earlier one, is to provide a furan base resin with the necessary toughness and flexibility for the production of wire enamels and other uses without substantially degrading its other valuable properties.

In the accompanying drawing, Figure 1 is a side elevation of a conductor wire insulated with a coating of my improved enamel, the coating being cut back so as to disclose the conductor; and Figure 2 is a cross section on the line 2—2 of Figure 1.

My invention here is based on the discovery I have made that furfuryl alcohol condensed to the point where it has the consistency of an oily liquid at room temperature, that is to say, where the partially condensed product has not yet reached the stage of a tacky solid, is a powerful solvent for polyvinyl acetal, that solutions of polyvinyl acetal in coal tar naphtha-cresol are compatible with coal tar naphtha solutions of such partially condensed furfuryl alcohol, and that films cast from a mixed solution of both remain clear and homogeneous throughout the drying period and also throughout the baking period which causes the conversion of both to their resinoid condition. The furfuryl alcohol condensate, unlike ordinary solvents which are volatilized and removed from the film when heated in the presence of air, remains in the film and constitutes the major portion of the ultimate film composition. Thus it acts as a solvent during the application of the enamel but becomes a hard, abrasion-resistant, solvent-resistant, and chemically inert resin film during the baking process; the tough, flexible, high molecular weight polyvinyl acetal becomes a minor constituent of the film after the latter is baked and serves the purpose of toughening and flexibilizing the otherwise brittle furfuryl resin film.

Heretofore, due to the substantial incompatibility of polyvinyl acetal with other materials, enamels containing polyvinyl acetal were so relatively low in solids content and of such high viscosity that it was difficult if not impracticable to use the conventional wire-coating apparatus in the usual manner for their application as a protective and insulating coating for wire. The enamel of the present invention is just the reverse, that is, it is high in solids content and low in viscosity, and for this reason can readily be applied to the coating of wire in the conventional manner. In addition, the baked films of the present enamel, as compared with those of former polyvinyl acetal enamels, are more solvent-resistant and are not thermoplastic. These films are solvent-resistant and non-thermoplastic because the furan resin is the major constituent.

One convenient method of preparing the furfuryl alcohol condensate is to charge 1000 parts (by weight) of furfuryl alcohol into a kettle equipped for both heating and cooling, and 50 parts of a catalyst such as a 2% sulphuric acid solution in diacetone is added to the cold alcohol while thorough mechanical agitation is effected with a stirrer. The exothermic reaction which ensues causes the temperature to rise without external application of heat. At 45° C. to 50° C. this temperature rise is checked and the temperature is held within this range by intermittent use of the cooling coil for a period of one hour. The temperature is then allowed to rise to 70° C. for the duration of the reaction. Alternate use of heating and cooling is generally necessary to maintain the reacting mass at 70° C. As condensation proceeds a regular increase in the density of the material takes place; and this provides a simple means of controlling the process. For, after the batch has reached 70° C., the stirrer may be stopped at regular intervals and a heavy Baumé hydrometer inserted into the materials. The first Baumé reading is generally of the order of 15° Baumé at 70° C. A regular increase takes place until, after about two and a half hours, the density at 70° C. is 17.4° Baumé. At this point the reaction is stopped and the condensate stabilized by neutralizing the catalyst with an excess of triethanolamine, about nine to ten parts being used.

These condensates may also be prepared by dissolving the furfuryl alcohol in water, acidifying and heating until the condensates have the desired densities, and neutralizing with a base to stop the condensation.

The heavy liquid condensate is dehydrated by heating at 120° C., with stirring, and is allowed to stand in order to settle out the insoluble matter formed in the condensation. The clear upper portion is then separated and thinned as a matter of convenience with a solvent consisting preferably of 75% coal tar naphtha and 25% cresylic acid. The amount of the naphtha-cresol solvent used is preferably such that the furfuryl alcohol condensate solution will contain about 50% solids. This solution is then filtered.

It should be pointed out that the condensation may be stopped within a considerable range of density values and need not be carried to precisely 17.4° Baumé. I have, for example, taken numbers of a series of furfuryl alcohol condensates which were carried to condensates of 14.8°, 15.5°, 16.1°, 16.5°, 17.0° and 17.4° Baumé respectively and have produced satisfactory enamels by combining each of them with polyvinyl acetal. Some differences are apparent in these various enamels, the most noticeable being the tendency to loss by volatilization in the oven where condensates of a very low degree of condensation are used, and loss of viscosity reducing action on the polyvinyl acetal where products of a higher degree of condensation are used. Nevertheless, the degree of condensation can be varied over a considerable range, the exact usage and type of equipment on which the enamel is applied generally determining the degree of condensation most satisfactory.

To make the enamel, the furfuryl alcohol condensate solution above referred to is blended with a solution of polyvinyl acetal in naphtha-cresol wherein the amount of naphtha-cresol is preferably such that the polyvinyl acetal solution will contain about 16.7% solids. As an example, the blended solution may contain the following proportions:

| | Parts by weight |
|---|---|
| Furfuryl condensate solution (50% solids in naphtha-cresol) | 400 |
| Polyvinyl acetal solution (16.7% solids in naphtha-cresol) | 300 |
| Thinner (75% naphtha—25% cresylic acid) | 200 |

It is not necessary, in preparing the furfuryl alcohol condensate, to use furfuryl alcohol alone since other compounds, such as furfural, which contain the furan nucleus, may be mixed with the alcohol to reduce expense; but there would be no advantage in this partial replacement of the alcohol other than to reduce expense. Neither is it necessary that the polyvinyl acetal be added to the furfuryl alcohol after, rather than before, the condensation of the latter although that procedure makes the handling of the materials easier. Hence, while the modifying or flexibilizing polyvinyl acetal may be added to the furfuryl alcohol in the beginning or at any stage prior to the completion of the condensation of the alcohol, there is little to be gained by so doing.

I claim:

1. The method of compounding an enamel having a furan resin base and containing a flexibilizing agent to improve its qualities for use as a wire coating, which method comprises condensing furfuryl alcohol to a density not substantially less than 14.8° nor substantially greater than 17.4° Baumé at 70° C., stopping the further condensation thereof, thinning the condensate with a naphtha-cresol solvent and adding thereto a solution of polyvinyl acetal in naphtha-cresol, the major portion of the solids in the blended solution consisting of the furfuryl condensate.

2. The method of compounding an enamel having a furan resin base and containing a flexibilizing agent to improve its qualities for use as a wire coating, which method comprises condensing furfuryl alcohol with the aid of a catalyst to a density of not substantially less than 14.8° nor substantially more than 17.4° Baumé at 70° C., neutralizing the catalyst to stabilize the condensate, thinning the condensate with a naphtha-cresol solvent and adding thereto a solution of polyvinyl acetal in the naphtha-cresol, the major portion of the solids in the blended solution consisting of the furfuryl condensate.

3. An insulating wire-enamel composition for conductors comprising a naphtha-cresol solution of furfuryl alcohol condensate of a density not substantially less than 14.8° nor substantially greater than 17.4° Baumé at 70° C. blended with a naphtha-cresol solution of polyvinyl acetal, the polyvinyl acetal constituting a minor part of the solids content of the composition.

4. As an article of manufacture, a metallic wire having an insulating and protective coating consisting of the infusible residue formed by baking a naphtha-cresol solution of a resinous composition comprising furfuryl alcohol condensate of a density not substantially less than 14.8° nor substantially greater than 17.4° Baumé at 70° C. and polyvinyl acetal, a major portion of the residue being furfuryl condensate.

5. The method of compounding an enamel having a furan resin base and containing a flexibilizing agent to improve its qualities for use as a wire coating, which method comprises condensing furfuryl alcohol to a density not substantially less than 14.8° nor substantially greater than 17.4° Baumé at 70° C., stopping the further condensation thereof, thinning the condensate with a naphtha-cresol solution and adding thereto a solution of polyvinyl acetal in naphtha-cresol, the polyvinyl acetal content being about 25 per cent of that of the condensate.

6. The method of compounding an enamel having a furan resin base and containing a flexibilizing agent to improve its qualities for use as a wire coating, which method comprises condensing furfuryl alcohol to a density not substantially less than 14.8° nor substantially greater than 17.4° Baumé at 70° C., stopping the further condensation thereof, dissolving the condensate in naphtha-cresol to produce a solution containing about 50 per cent solids, adding thereto a solution of polyvinyl acetal in naphtha-cresol, the polyvinyl acetal content being about 25 per cent of that of the condensate, and adding additional naphtha-cresol until the blended solution contains about 28 per cent solids.

7. An insulating wire-enamel composition comprising a naphtha-cresol solution of (1) furfuryl alcohol condensate of a density not substantially less than 14.8° nor substantially greater than 17.4° Baumé at 70° C. and (2) polyvinyl acetal, the polyvinyl acetal content being about 25 per cent of that of the furfuryl condensate and the composition having a total solids content of about 28 per cent.

8. As an article of manufacture, a metallic wire having an insulating and protective coating consisting of the infusible residue formed by baking on the wire a coating of enamel made according to the method of claim 5.

9. As an article of manufacture, a metallic wire having an insulating and protective coating consisting of the infusible residue formed by baking on the wire a coating of enamel made according to the method of claim 6.

HENRY J. KAUTH.

REFERENCES CITED

The following references are of record in the file of this patent:

UNITED STATES PATENTS

| Number | Name | Date |
|---|---|---|
| 2,267,830 | Lewis | Dec. 30, 1941 |
| 2,243,560 | Hall et al. | May 27, 1941 |
| 2,095,250 | Heberer | Oct. 12, 1937 |
| 2,323,333 | Kauth | July 6, 1943 |
| 2,366,049 | Payne et al. | Dec. 26, 1944 |
| 2,399,055 | Nordlander | Apr. 23, 1946 |

FOREIGN PATENTS

| Number | Country | Date |
|---|---|---|
| 549,515 | Great Britain | Nov. 25, 1942 |